Dec. 26, 1939.   G. GOEBEL ET AL   2,184,296
SHEET FEEDER
Filed June 10, 1935   10 Sheets-Sheet 1
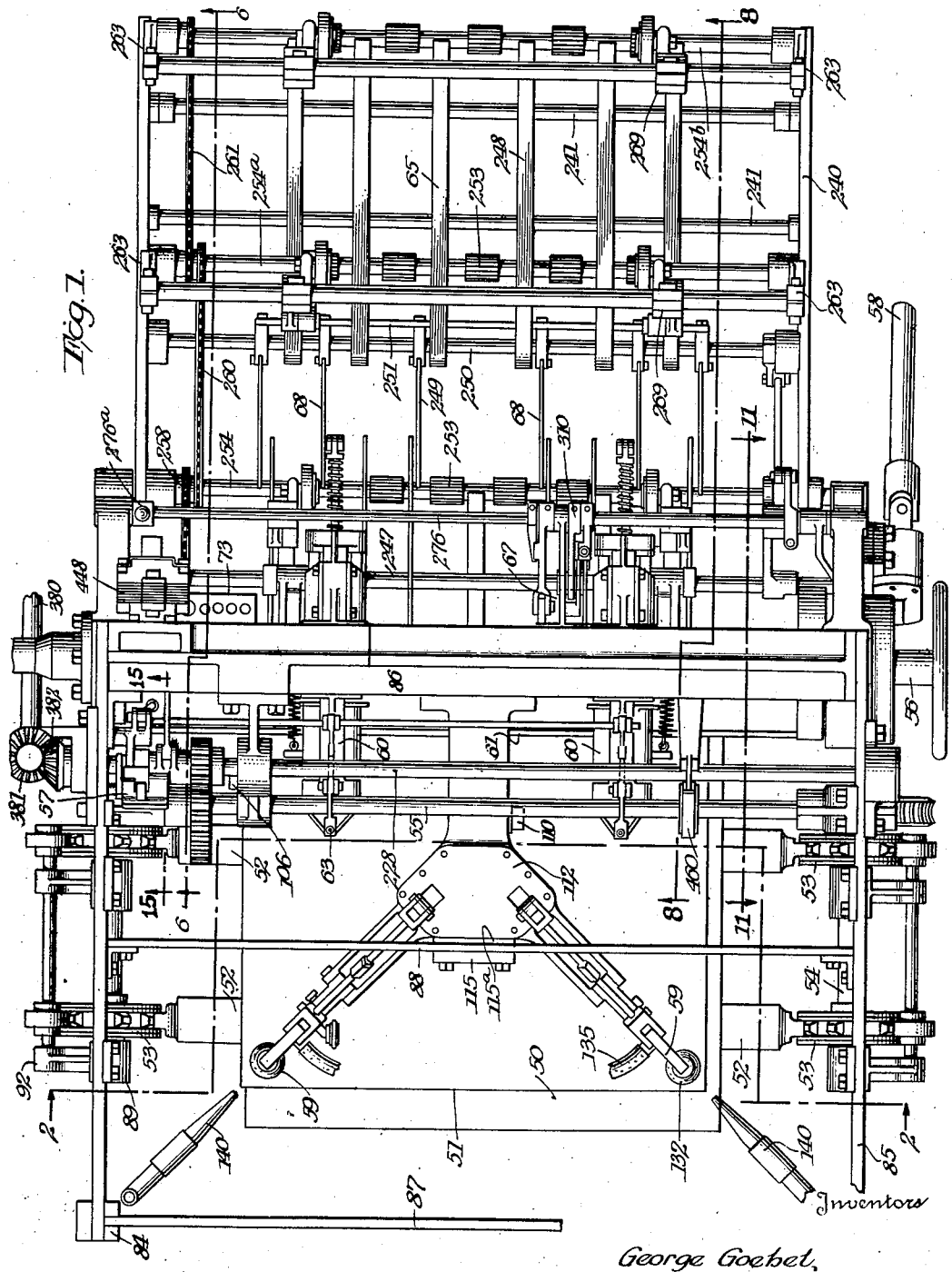
Inventors
George Goebel,
Sherman A. Chantland
By Cushman Darby Cushman
Attorneys

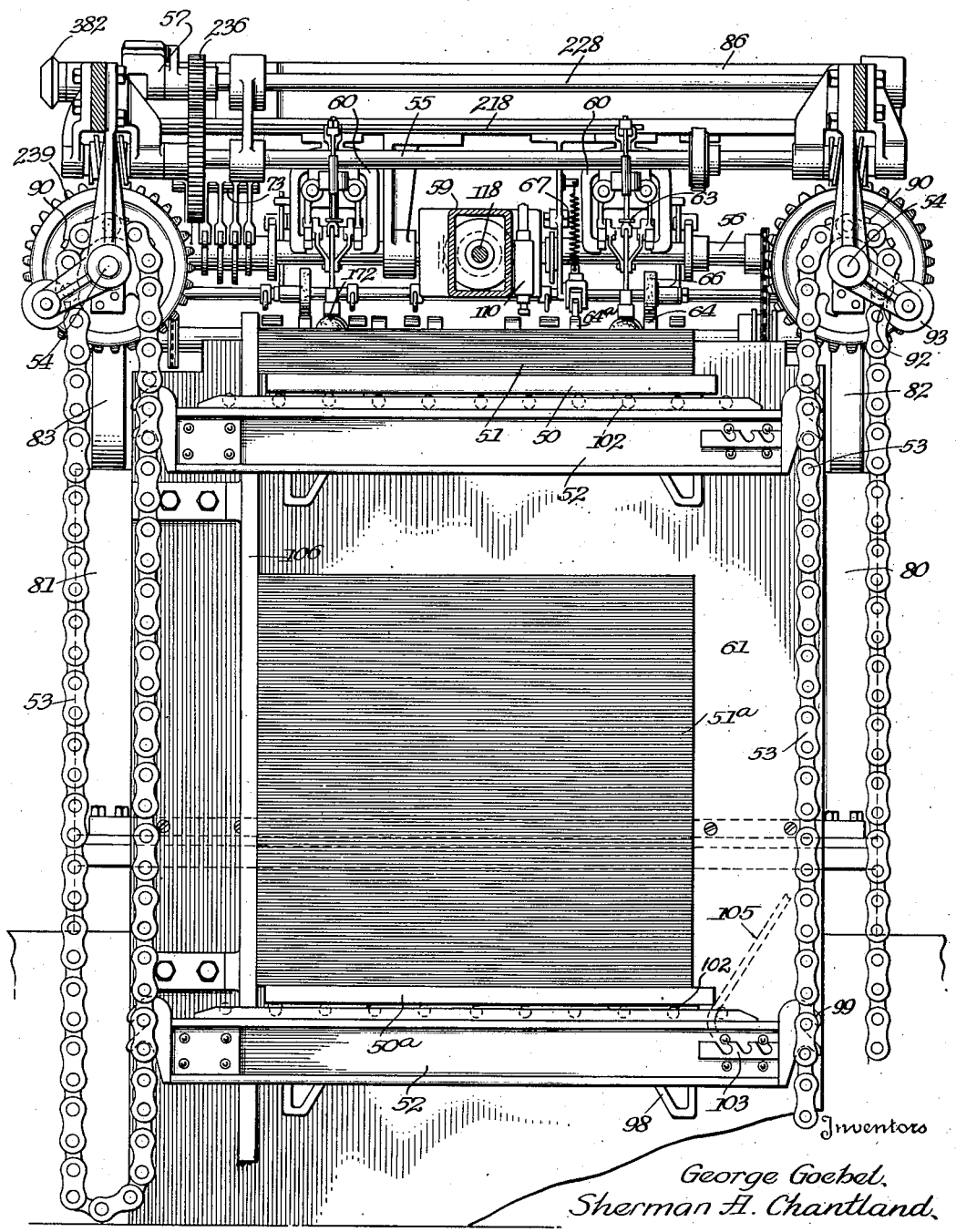

Dec. 26, 1939.  G. GOEBEL ET AL  2,184,296
SHEET FEEDER
Filed June 10, 1935   10 Sheets-Sheet 3
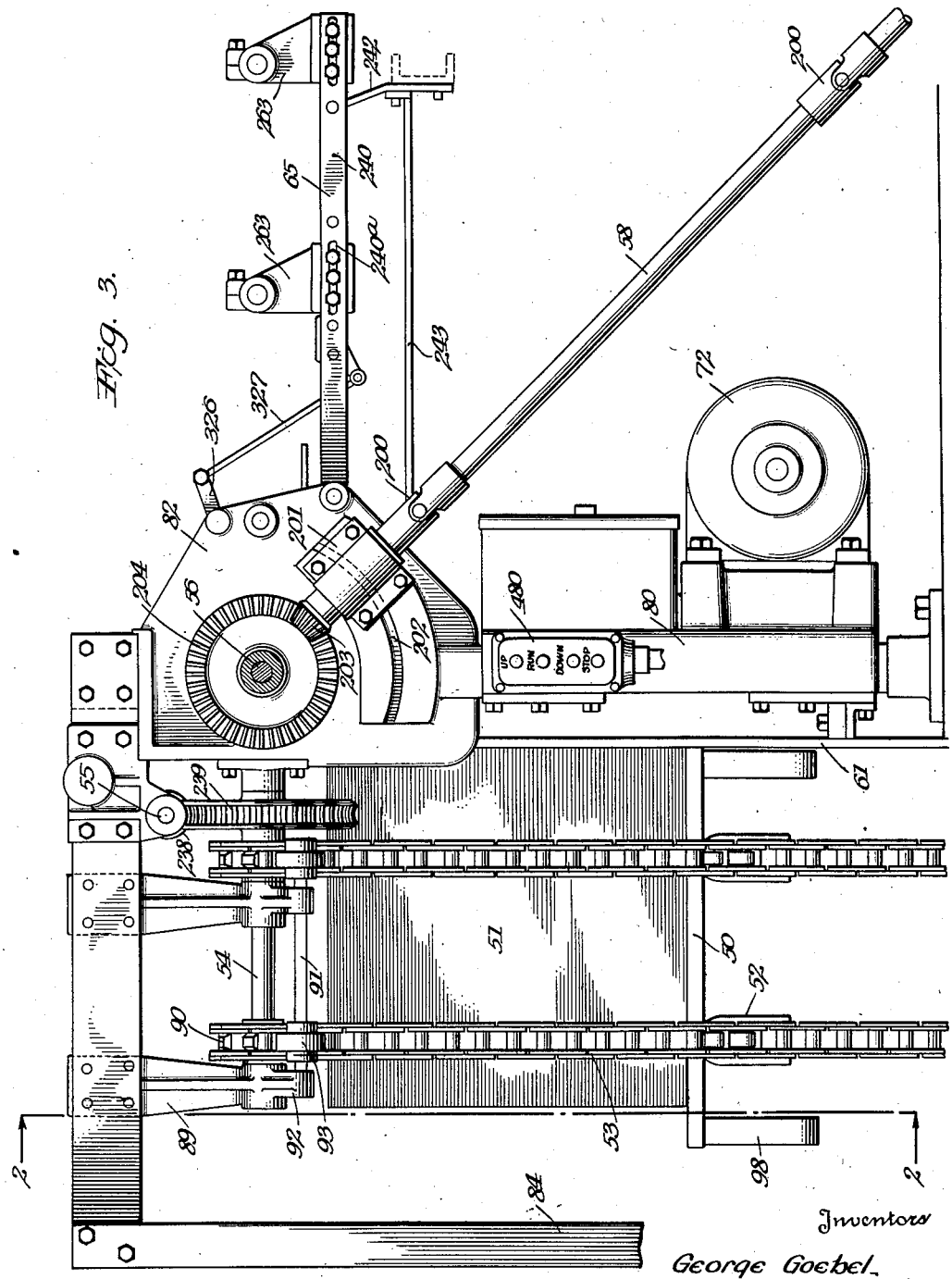
Inventors
George Goebel
Sherman A. Chantland
By Cushman Derby & Cushman
Attorneys

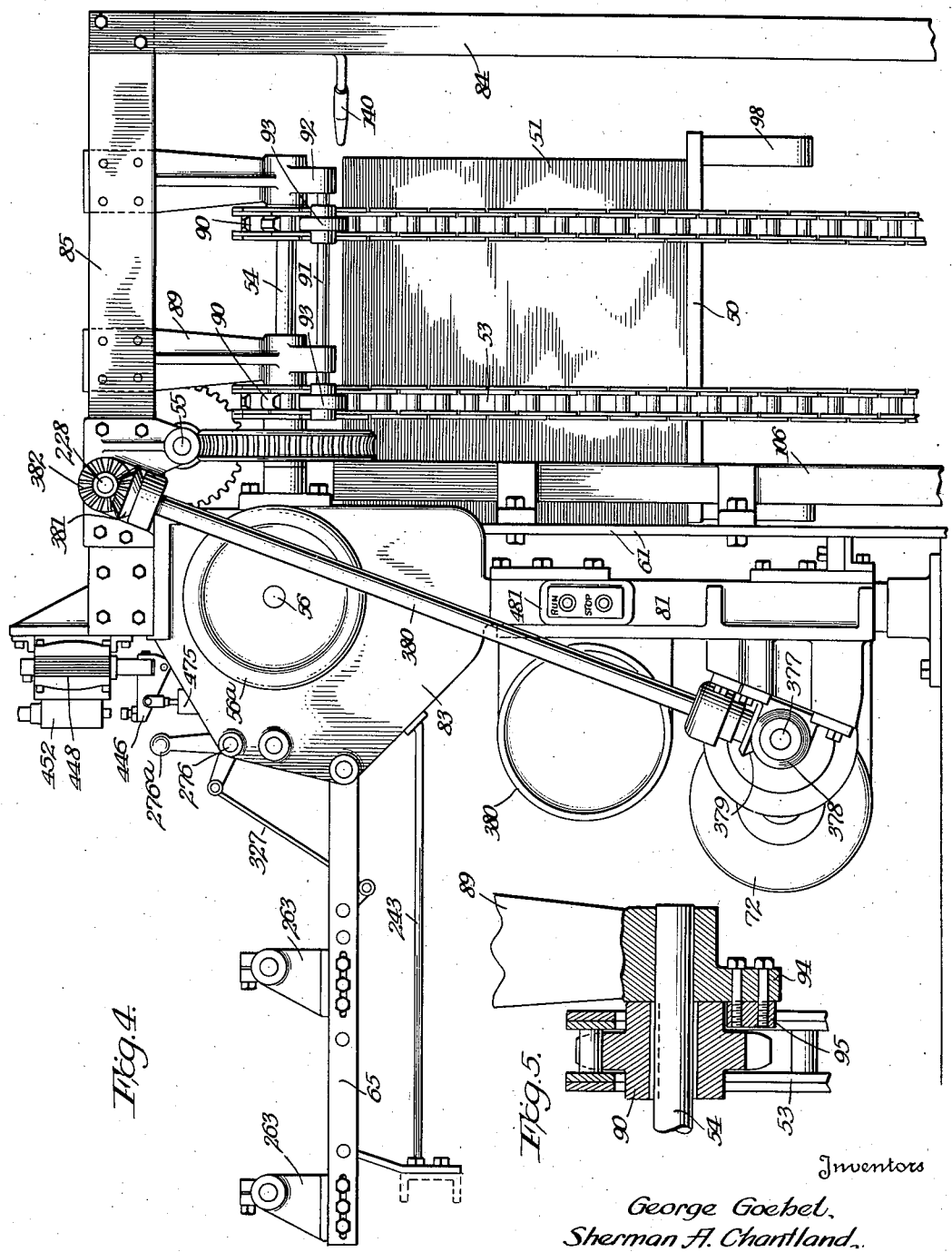

Dec. 26, 1939.　　　G. GOEBEL ET AL　　　2,184,296
SHEET FEEDER
Filed June 10, 1935　　　10 Sheets-Sheet 5
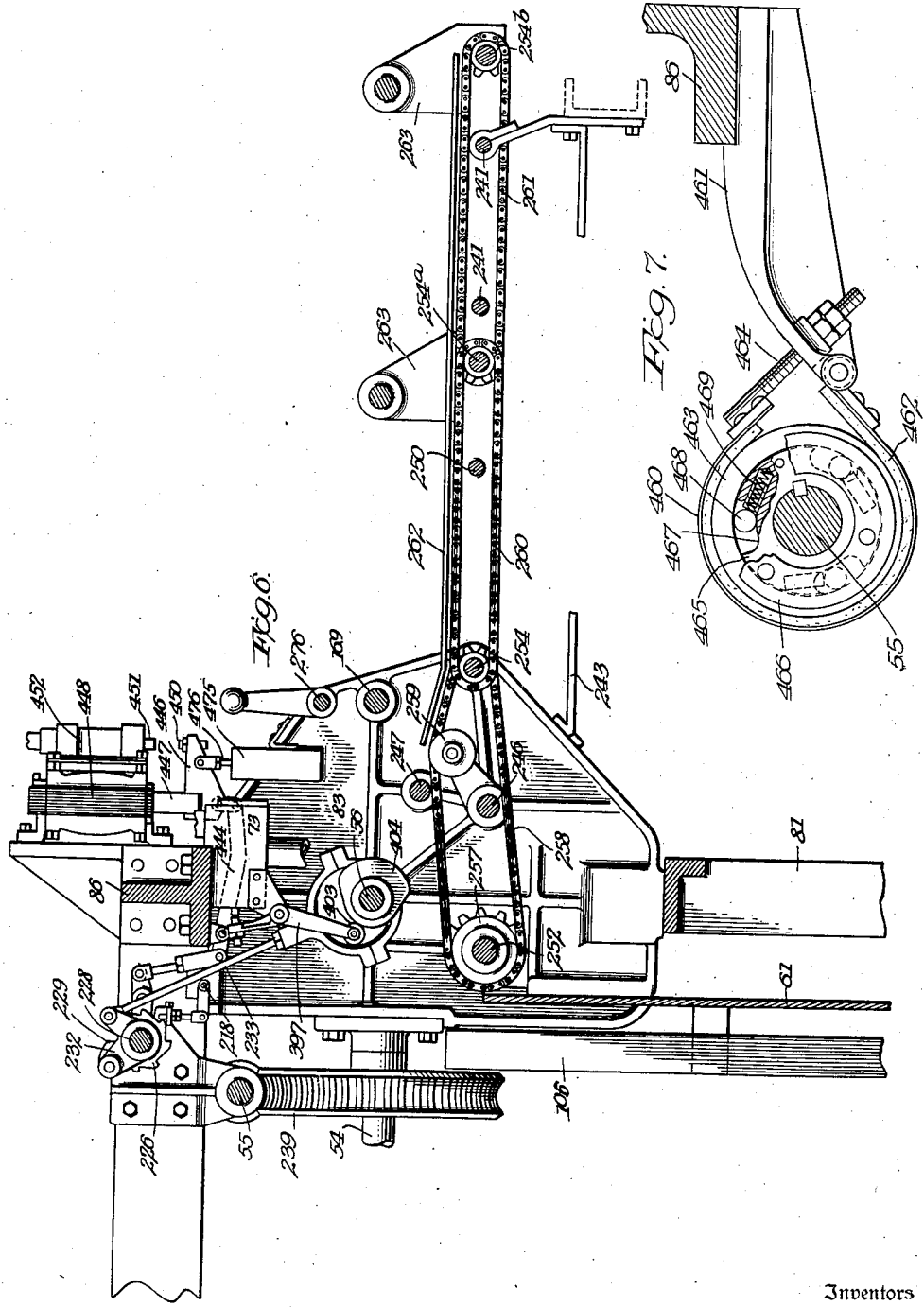
Inventors
George Goebel,
Sherman A. Chantland,
Cushman, Darley & Cushman
Attorneys Dec. 26, 1939.  G. GOEBEL ET AL  2,184,296
SHEET FEEDER
Filed June 10, 1935  10 Sheets-Sheet 6
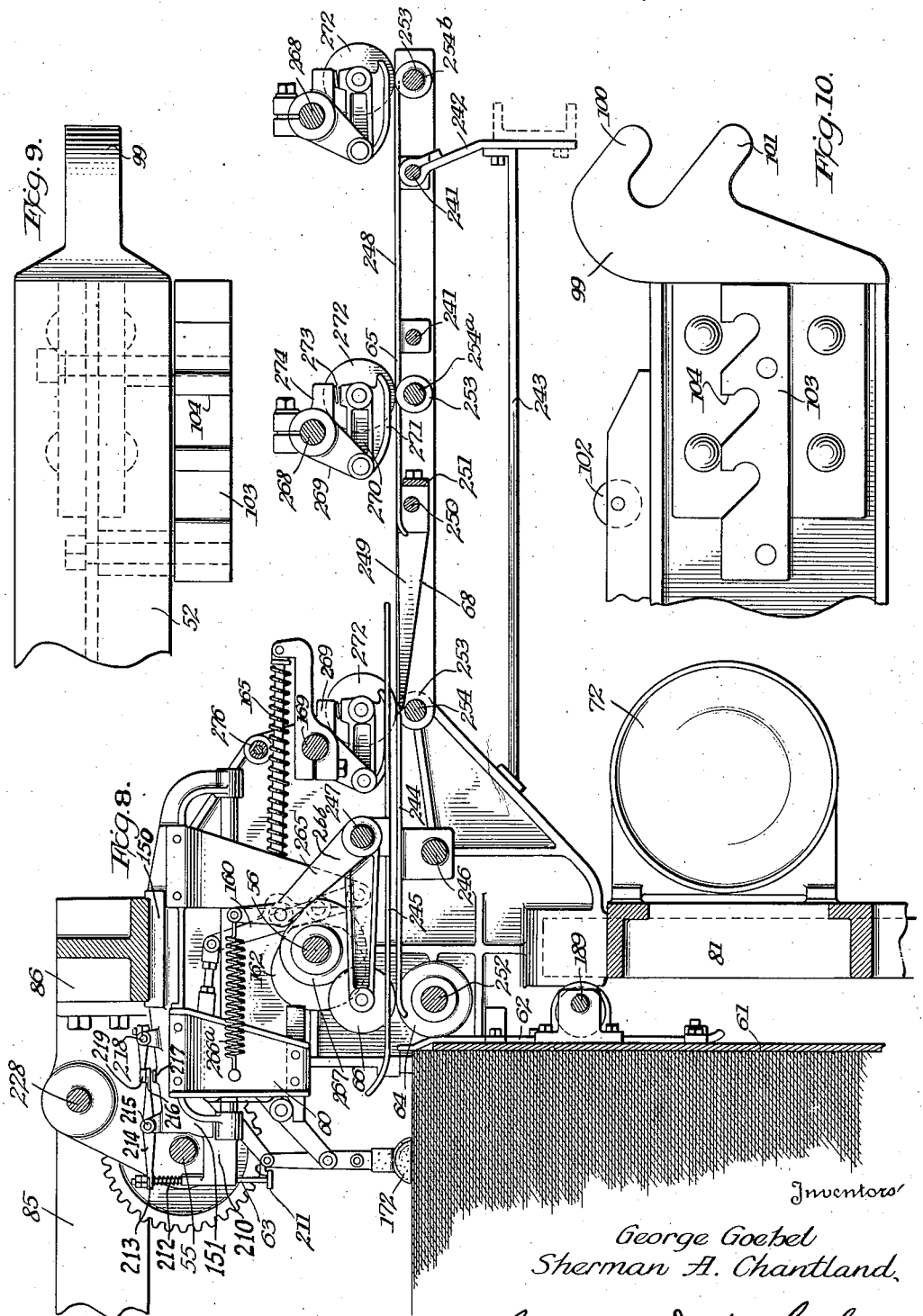
Inventors
George Goebel
Sherman A. Chantland
By Cushman Darby & Cushman
Attorneys

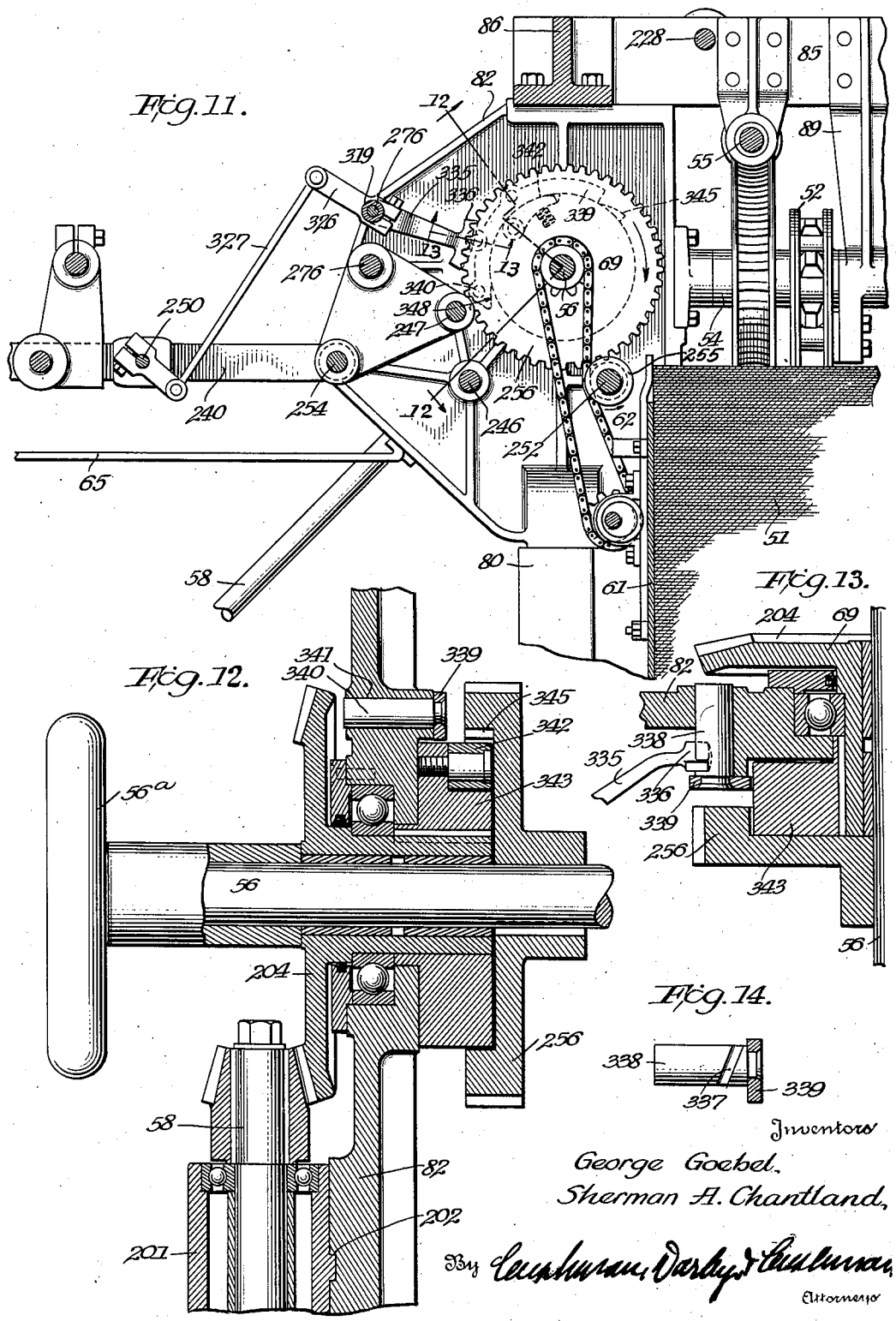

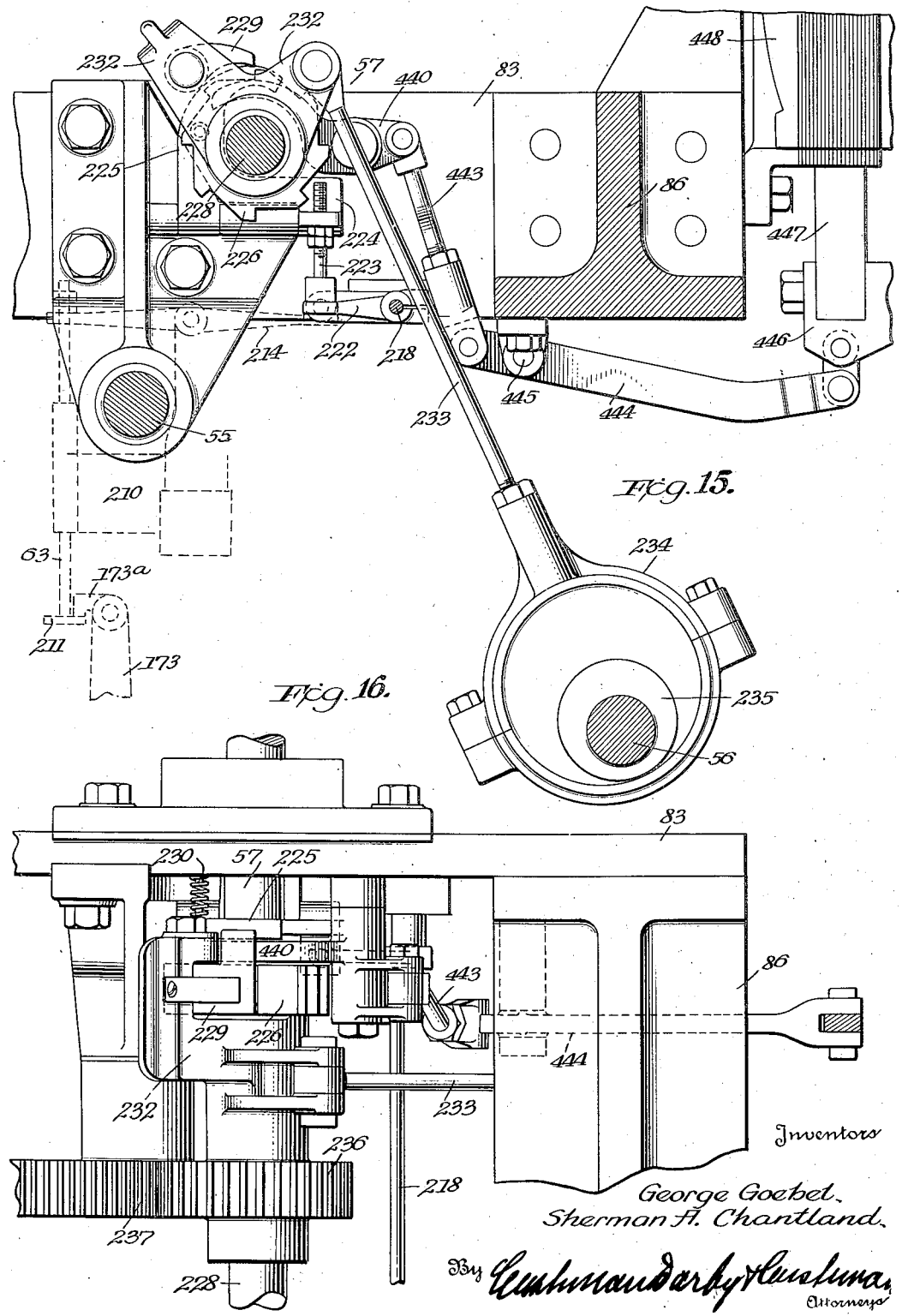

Dec. 26, 1939.   G. GOEBEL ET AL   2,184,296
SHEET FEEDER
Filed June 10, 1935   10 Sheets-Sheet 9

Inventors
George Goebel,
Sherman H. Chantland,
By Cushman Darby & Cushman
Attorneys

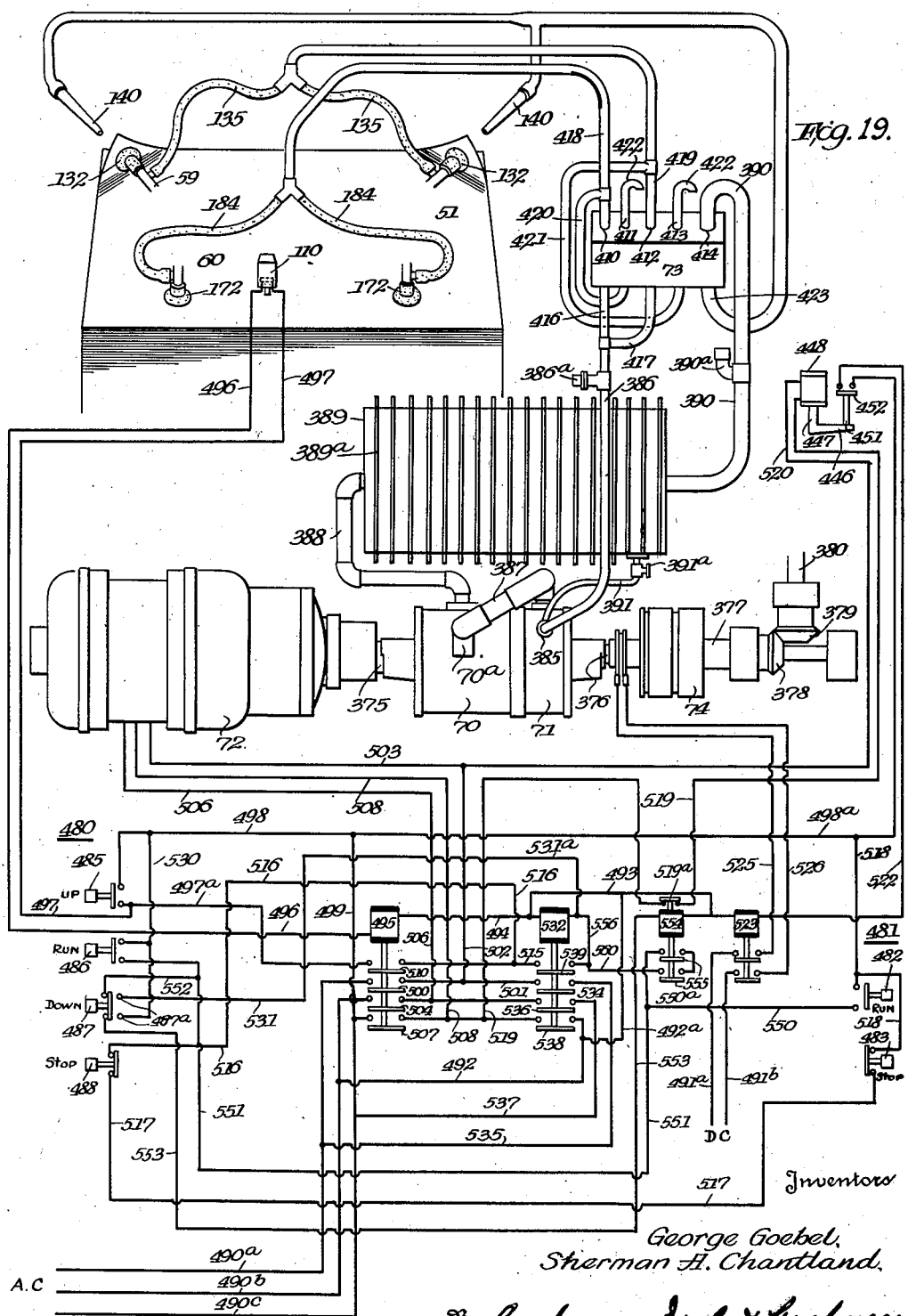

Patented Dec. 26, 1939

2,184,296

UNITED STATES PATENT OFFICE 2,184,296

SHEET FEEDER

George Goebel and Sherman A. Chantland, Baltimore, Md., assignors to Crown Cork & Seal Company, Inc., Baltimore, Md., a corporation of New York Application June 10, 1935, Serial No. 25,908

20 Claims. (Cl. 271—31)

The present invention relates to sheet feeders and, more particularly, to sheet feeders designed to deliver sheets of material to a printing press, or to any apparatus designed to perform work upon a sheet of material.

The principal object of the invention is to provide a sheet feeder of maximum efficiency in delivering but one sheet at a time to the press or other apparatus to which the sheets are to be fed, and which will successfully handle a wide range of types of materials.

An object of the invention is to provide a form of stack platform supporting mechanism particularly designed to permit the insertion and support of a second platform at any point on the supporting mechanism after a previously inserted platform has been moved upward to such an extent that the stack of sheets thereon is substantially exhausted, the structure including means to permit the stack to be properly positioned with respect to the machine.

In prior machines, the stack platform and its chain engaging elements have been rigidly connected, or the supporting chains have been engaged by sprocket wheels at their lower ends. With either arrangement, it has been difficult to place a second stack in position, particularly if the chains are engaged by sprockets at their lower ends, because such an arrangement prevents the chains from being moved apart and a second platform positioned between and upon them.

The stack platform of the present machine is supported upon cross bars which releasably engage the inner runs of endless chains having their upper portions passing about sprockets or the like. The stack platform being preferably loosely supported on the cross bars, is readily removable therefrom. The lower ends of the endless chains hang free and an additional pair of cross bars to support a second platform, or a second platform provided with rigid cross bars, may therefore be readily engaged with the lower portions of the chains at any point thereon when the initially positioned platform has been moved upwardly to such an extent that the stack of sheets thereon is almost exhausted.

Another object of the invention is to provide a stack lift control mechanism which is so arranged that it will be continuously responsive to the height of the pile at points adjacent the front suction cups or forwarder mechanisms.

In the types of feeders now customarily used, the stack lift control mechanism is centrally located with respect to the width of the pile and is therefore only responsive to the height of the pile at that point. On the other hand, the front suction cups or forwarders are positioned adjacent the side edges of the pile. With such an arrangement, the lift control mechanism is not entirely effective, since the central portion of the pile may be at the desired height, i. e., at the level of the front suction cups or forwarders, while the side of the pile adjacent a forwarder may be so low that it cannot be engaged by that forwarder. This difficulty is frequently encountered in the handling of thicker stock such as metal sheets. In a stack of such sheets approximately three feet high, the thickness of the sheets may vary to such an extent over their surface area that one side of the pile will be in an inch or more lower than the other side. Obviously, if the lift control mechanism engages a central point on the pile, it will not be responsive to the fact that one side of the pile is so low that it cannot be engaged by the forwarder on that side. In order to correct for this difficulty, it has heretofore been necessary to drive wedges into the lower portion of the low side of the stack to raise the sheets to the extent necessary to permit them to be engaged by the forwarder on that side. The use of such wedges tends to mar the sheets, especially those which have previously been printed.

The lift control mechanism of the present invention includes a trip member positioned adjacent each front suction cup or forwarder, and adapted to be engaged by the corresponding forwarder in its downward movement toward the sheet if that cup must move downwardly a greater than predetermined distance in order to engage the sheet. If the cup engages the member, the lifting mechanism will be actuated to raise the stack a distance substantially corresponding to the thickness of one of the sheets being handled. This positioning of a lift control trip immediately adjacent each of the front cups, and also the further provision of means whereby either trip member may actuate the lifting mechanism, will insure that the lowest side of the stack is high enough.

Another object of the invention is to provide a novel form of mechanism for raising and lowering the stack to permit sheets to be positioned in the stack lifting mechanism.

Whenever the sheets are exhausted from the stack platform, it is necessary to change stacks by lowering the empty platform from raised position and raising a new and filled platform into proper relation to the separating and forwarding means. The lift control mechanism used to raise the stack step by step during the normal operation of a feeder operates much too slowly to permit it to be efficiently used when a platform of sheets is to be raised to feeding position during the stack changing operation, and it is therefore desirable to provide a supplemental drive which will more rapidly raise or lower the stack when such an operation must be accomplished.

The supplemental lifting drive of the present invention includes means to lift or release the pawl which ordinarily controls the lifting of the stack and is an improvement upon the types of corresponding mechanisms now customarily used in that it includes means to prevent over-running of the stack and also a means to prevent the lifted pawl from dropping too suddenly into engagement with its ratchet wheel when the raising or lowering movement is completed. During the operation of the supplemental drive for changing stacks, some over-running of the drive ordinarily occurs by reason of the more rapid movement of the platform during this phase of the operation of the machine, and it is therefore desirable to include a means to prevent such over-running and also a means to prevent the pawl from dropping into engagement with its ratchet too suddenly when the power is shut off, that is, before the over-running is ceased.

Another object of the invention is to provide a supplemental or stack changing drive, including a control therefore, which is of maximum simplicity.

Heretofore, gear change mechanisms have been provided to permit the stack to be moved more rapidly during stack changing operations. The drive arrangement of the present feeder is so designed that no speed change mechanism is necessary.

Other objects and advantages of the invention will be apparent from the following specification and drawings, wherein:

Figure 1 is a plan view of the feeder.

Figure 2 is a transverse vertical sectional view on the line 2—2 of Figure 1.

Figure 3 shows the right-hand side of the feeder in elevation.

Figure 4 shows the left-hand side of the feeder in elevation.

Figure 5 is a detail of one of the driving sprockets for the stack lifting and lowering chains, the view being in axial section.

Figure 6 is a longitudinal vertical section through a portion of the feeder taken on the line 6—6 of Figure 1.

Figure 7 is a detail view showing an over-run preventing device provided on the lift drive shaft of the machine.

Figure 8 is a longitudinal vertical section through a portion of the machine taken on the line 8—8 of Figure 1.

Figure 9 is a plan view of one end of one of the platform supporting cross bars used in the machine.

Figure 10 is a side elevation of the structure shown in Figure 9.

Figure 11 is a longitudinal vertical sectional view of a portion of the machine taken on the line 11—11 of Figure 1.

Figure 12 is a vertical sectional view of the main clutch of the machine taken on the angled line 12—12 of Figure 11.

Figure 13 is a detail sectional view of the main clutch operating mechanism taken on the line 13—13 of Figure 11.

Figure 14 is a detail view of a clutch operating stud included in the structure shown in Figure 13.

Figure 15 is a detail vertical sectional view showing the stack lift control mechanism, the view being taken on the line 15—15 of Figure 1.

Figure 16 is a plan view of the pawl and ratchet lift control mechanism shown in Figure 15.

Figure 17:
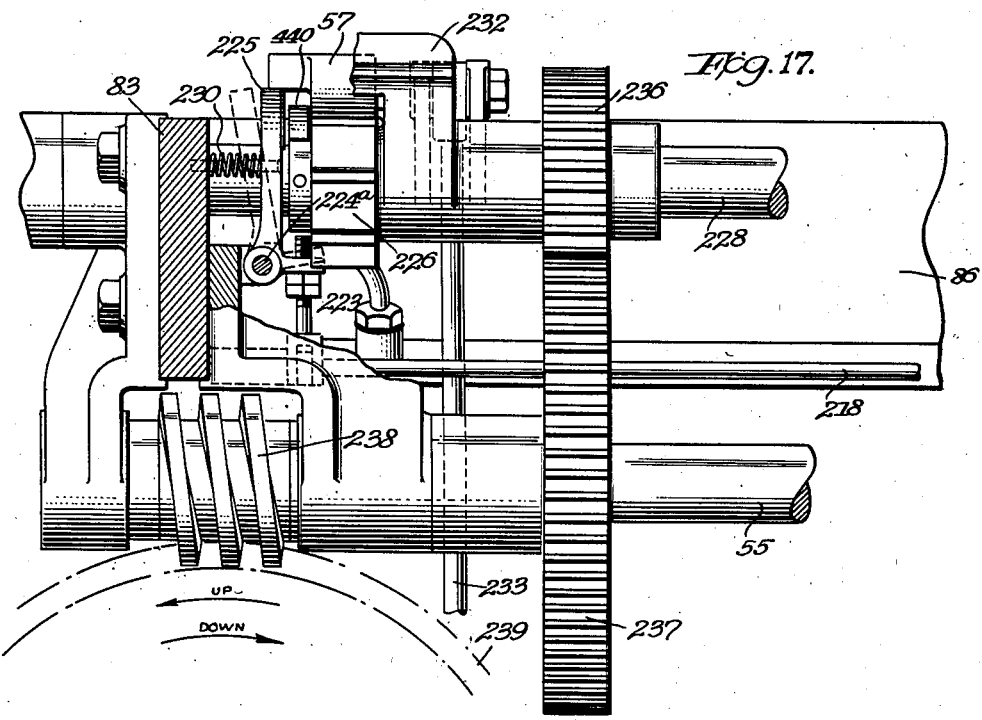
Figure 17 is a view showing the stack lift control mechanism, looking from the left of Figure 16, with parts broken away.

In the following description of the apparatus of the invention, the front of the sheet feeder is regarded as the end which would be positioned adjacent the press or other apparatus to which sheets are delivered by the feeder, the rear would be the end at which the stack of sheets is positioned for separation by the feeder, and the left and right sides of the apparatus would be these sides as viewed by a person standing at the rear of the feeder and facing the same.

In order that the relation of the various mechanisms of the feeder may be more readily understood, the principal elements of the apparatus and their related operations are broadly described below:

A stack platform 50 (Figures 1 and 2) is provided at the rear of the machine and on this is carried the pile of sheets, designated by the numeral 51, the platform 50 being supported on cross bars 52 having their ends removably engaged in the inner runs of pairs of endless chains 53 passing about sprocket wheels on chain driving shafts 54. The chain driving shafts 54 are driven from a shaft 55 extending transversely of the feeder and rotated step by step during the normal operation of the machine from a main cam shaft 56 by means of a pawl and ratchet mechanism 57. The main cam shaft 56, upon which are mounted or from which are driven all of the timing elements or cams of the machine, is preferably driven from a main drive shaft 58 extending from the press or other apparatus to which the sheets are delivered by the present feeder.

The lifting of the platform 50 causes the uppermost sheet of the stack 51 to be presented to rear suction cups or sheet separators 59 and front suction cups or forwarders 60. As indicated in Figures 1 and 2 and, as described in our divisional application for Sheet handling mechanisms for sheet feeders, Serial Number 252,052, filed January 20, 1939, the rear suction cups 59 are positioned above the rear corners of the uppermost sheet on the stack and will descend to lift and bend these corners, the line of bending being diagonally of the sheet. A blast of air is simultaneously directed beneath each lifted corner to separate or float the upper sheet from the next lowest sheet. Just before the suction of the rear cups is released and while the sheet is floating, the front suction cups or forwarders 60 move downwardly and engage the front portion of the sheet, lifting it and then moving it forwardly over a stack gauge plate 61 against which the front edges of the sheets in the stack contact.

As the sheet moves over the upper edge of the stack gauge plate 61, a moving stripper 62 (Figure 8) engages the undersurface of the forward portion of the sheet to remove therefrom any sheet which might otherwise adhere to the uppermost sheet and to return the adhering sheet to the stack 51, as described in our above-mentioned divisional application.

The sheet stack 51 is kept at a height to permit the uppermost sheet to be engaged by the separators 59 and forwarders 60 by means of a lift control mechanism including trip members 63, one positioned adjacent each forwarder 60, and either of which is arranged to be operated by a forwarder in its downward movement if the portion of the uppermost sheet beneath the forwarder is not at the proper height.

The forwarders 60 position the sheet upon driven outfeed rolls 64 included in the feed table 65, hold-down rolls 66 press downwardly upon it to hold it in contact with the rolls 64 so that it will be moved along the feed table, and during the initial portion of this movement it passes through a calipering or gauging mechanism 67. As described in our divisional application for Calipering mechanism filed January 20, 1939, the calipering mechanism 67 generally indicated in Figures 1 and 2 is so designed that if but one sheet passes through the same, it will be permitted to move forwardly along the feed table 65 to the press or other apparatus to which the feeder delivers. If two sheets simultaneously pass through the calipering mechanism, this mechanism will operate to raise a reject member 68, thereby diverting the sheets to a point beneath the feed table 65. Should three sheets pass simultaneously through the calipering mechanism, the reject member will be raised and the main clutch 69 of the machine, provided on the main cam shaft 56, will be disengaged to stop the operation of the feeder.

The suction and compressed air required in the operation of the machine is provided by pumps 70 and 71, respectively, (Figure 19) driven by a motor 72 mounted on the feeder and beneath the feed table 65, the flow of fluid being controlled by a valve mechanism 73. The motor 72 may also be connected through a clutch 74, preferably of the magnetic type, to raise or lower the stack platform 50 when it is necessary to change stack platforms, that is, to insert a full platform in place of one from which the sheets have been entirely removed by the forwarders 60. During such operation, the lift control pawl and ratchet mechanism 57 is disconnected.

*The machine frame and stack supporting structure*

The frame of the feeder of the present invention comprises front standards 80 and 81, respectively positioned on the right and left sides of the machine. A side plate 82 is fixed to the standard 80 and a side plate 83 extends upwardly from the left-hand standard 81. Rear standards or uprights 84 are spaced from the standards 80 and 81 and are connected to the side plates 82 and 83, respectively, by horizontal beams 85. The uppermost portions of the side plates 82 and 83 are connected by a transverse beam 86 beneath which is positioned the main cam shaft 56. The upper ends of the rear uprights 84 are similarly connected by a horizontal beam 87. A horizontal beam 88 is fixed to the side beams 85 intermediate their ends.

The chain driving shafts 54 are supported beneath the side beams 85 in depending brackets 89, best shown in Figures 3 and 4, and a pair of spaced sprocket gears 90 is fixed to each of these shafts, the lift chains 53 moving about these sprockets. The lift chains 53 are of endless form and their lower ends hang free. In order to hold the outer runs of the chains in proper engagement with the sprocket gears 90, a fixed rod 91 is supported in downward and outward extensions 92 of the brackets 89, rod 91 carrying a roller 93 in alignment with each of the chains 53, which rollers force the links of the chains 53 to remain in intermeshed relationship with the teeth of the sprocket gears 90, as shown in Figure 2.

The manner of operation of the chain driving shafts 54 during the normal operation of the feeder is hereinafter described under the heading "The platform lift control mechanism" while their operation for stack changing and positioning is described under the heading "Drive mechanism used in changing stacks".

In order to prevent the outer runs of the chains 53 from wrapping about the sprocket gears, each bracket 89 includes a downward projection 94 (Figures 2 and 5) and on the face of this projection adjacent the corresponding sprocket 90, between the extension 94 and the teeth of the sprocket, is bolted a plate 95. As the chain moves downwardly about the outer side of the sprocket, should it tend to move inwardly to wind about the sprocket, such movement will be resisted by the plate 95.

The stack supporting platform 50 is preferably in the form of a runner of the type used on industrial trucks, that is, it has skids or feet 98 upon its side edges, the runner being positioned in the machine in such a manner by the operator that the skids 98 will be arranged transversely of the machine. The platform 50 is supported, during the operation of the machine, upon the cross bars 52 as best shown in Figure 2. These cross bars are provided with hook members 99 at each end thereof, which members are of double form. As is best shown in Figure 10, the upper hook 100 is adapted to bear upon one of the cross-pins of the chain 53 with which it is engaged, and when the upper hook is so positioned, the lower hook 101 will be positioned slightly above the next lowest cross-pin of the chain. This arrangement permits the bars to be more readily inserted in the links of the chain but it will be obvious that should the upper hook 100 break, the lower hook 101 will drop into contact with the cross-pin in the link in which it is positioned, thereby preventing the stack of sheets from dropping from the machine.

When the runner or platform 50 has been placed in position on the flooring at the rear of the machine, and between the chains 53 at each side thereof, the cross bars 52 may be readily positioned between the skids of the runner and their hooked ends engaged in the chains 53. In order to permit the runner to be moved longitudinally of the cross bars so that the sheets thereon may be properly gauged with respect to the machine, a number of rollers 102 are provided on the upper surfaces of the cross bars 52. To enable the platform to be moved upon the rollers, a plate 103 provided in its upper surface with notches 104 is fixed upon the surface of each cross bar 52 which will, in use, be positioned at the right and rear end of the cross bar. The notches 104 in plate 103 are adapted to receive the end of a bent-end crowbar such as is indicated in dotted lines at 105 in Figure 2. By this arrangement, the platform 50 may be moved toward the left side of the machine to cause that edge of the plates in the stack 51 to contact with a vertically extending gauge bar 106 which is spaced from the surface of the gauge plate 61. When the stack of plates is positioned on the platform 50, the left-hand edge of the sheets should project past the edge of the platform in order that the sheets may subsequently contact with the gauge bar 106. In moving the stack and platform to the left, they are preferably moved such a distance in this direction and with respect to the cross bars 52 that the latter, moved to the right by the use of the crowbar 105, will swing the inner runs of the chains 53 to be inclined slightly toward the right, with the result that the lifting action of the chains will continue to draw or hold the stack to the left and against the gauge bar 106.

The provision of endless chains 53 hanging free at their lower ends enables a second platform indicated at 50a, supported on a second pair of cross bars 52, to be positioned between and in the chains 53 after the first platform 50 has been raised and the stack of sheets thereon substantially removed. That is to say, since the lower ends of the chains are free, the portion of their length below the first platform 50 may be swung about as desired in order to permit the hooked ends 99 of the cross bars to be engaged therewith. When the stack of sheets has been entirely removed from the first or upper platform 50, the direction of movement of the chains 53 may be reversed as hereinafter described to move this platform downwardly and away from the mechanisms 59 and 60 so that the upper platform 50 and its supporting cross bars 52 may be disengaged from the chains 53. The chains may then be driven upwardly again to position the uppermost sheet of the lower stack 51a immediately beneath the suction cups.

An over travel limit switch 110 illustrated in Figure 2 is mounted on the casing of the separator mechanism 59 and in the path of upward movement of the stack of sheets to prevent the stack from being moved too far in an upward direction. The construction described above whereby a second stack of sheets may be secured to the platform lifting chains 53 before the preceding stack is entirely exhausted, permits the machine to be operated almost continuously, since it is not necessary to lower the first stack entirely to the floor of the plant after the sheets thereon have been exhausted and before a second stack may be placed in position.

*The platform lift control mechanism*

The platform lift controlling mechanism, in relation to the other elements of the apparatus, is illustrated in Figures 1, 2, and 8, and is shown in detail in Figures 15 to 18.

The platform lift mechanism is arranged to hold the stack at such height that the uppermost sheet thereof can be engaged by the front suction cups 172 of the forwarder mechanisms 60 to enable these cups to properly engage the surface of the uppermost sheet as described in our said divisional application for Sheet handling mechanism for sheet feeders, the power for raising the platform under such conditions, that is, during the operation of the feeder, being furnished from the main cam shaft 56.

The main cam shaft 56 of the machine is driven from a shaft 58 (Figure 3) extending from the apparatus to which the feeder delivers sheets. As is best shown in Figure 3, the shaft 58 may include suitable universal joints such as indicated at 200 to permit it to extend between the two apparatuses at the proper angle. Also, the end of the shaft 58 adjacent the feeder is supported in a housing 201, which housing has an arcuate key on its inner face which is adapted to be fitted in an arcuate groove 202 on the side plate 82 on the right side of the feeder. By this arrangement, the angle of the shaft 58 may be changed by varying the position of the housing 201 without changing the relation of a bevel gear 203 provided on the upper end of shaft 58 with respect to a large bevel gear 204 mounted on the main cam shaft 56 and arranged to drive the cam shaft through a clutch 69, as indicated in Figure 12.

As is best shown in Figure 8, the forwarder supporting bar or beam 150 is provided on its rear end 151 with a horizontal extension 210, which extension has a vertical bore therethrough in which is mounted the trip member 63. The trip member 63 is in the form of a rod having a head 211 at its lower end. A spring 212 is positioned about the trip member, the lower end of the spring bearing upon the extension 210 and the upper portion of the spring bearing against the underside of the rear end 213 of a lever 214 pivoted on the forwarder supporting bar 150 at 215. The upper end of the trip 63 is provided with nuts above the lever 214 to hold the spring 212 under the desired tension. The forward end 216 of lever 214 is adapted to bear upon a seat 217 on the supporting bar 150 when the spring 212 is free to force the opposite end of the lever upwardly. To transmit the movement of the trip 63 to the pawl and ratchet mechanism 57, a rod 218 to the rear of the cross beam 86 extends across the machine, this rod being provided with arms 219, each having its outer end adapted to rest or bear upon the upper surface of the forward end 216 of one of the levers 214 so that upward movement of this end of the lever 214 will raise the arm 219 to turn the rod 218.

Figure 18:
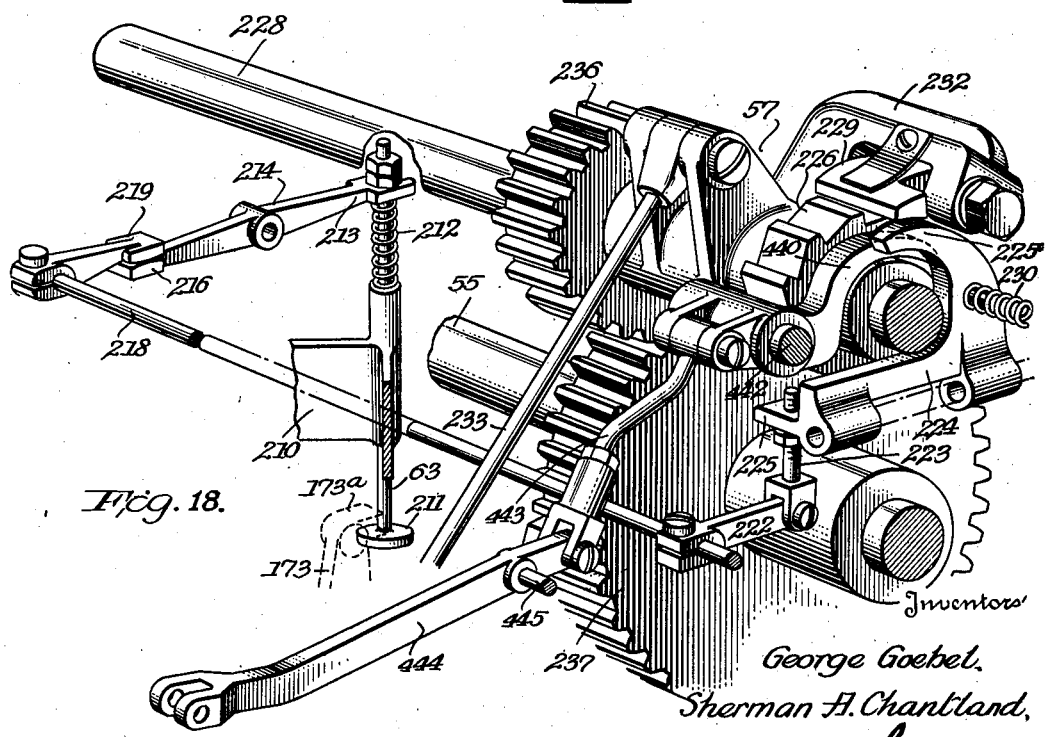
Figure 18 is a perspective view of the stack lift control mechanism shown in Figures 15 to 17, and Figure 19 diagrammatically shows the pumps, the motor for driving the same, and the flow circuit and wiring of the machine.

Figure 18 shows, in perspective, the mechanism described above, and its relation to the pawl and ratchet mechanism 57. As is illustrated in this figure, the rod 218 at one end (as viewed from the rear of the machine, the left-hand end) has an arm 222 fixed thereto and the outer end of this arm is connected by a pivotally connected link 223 to a pawl hold-out member 224. The member 224 is pivoted, on a horizontal axis, to the adjacent side plate of the machine at 224a, and link 223 has nuts thereon bearing on the underside of a horizontally extending flange 225 on the member 224. Member 224 includes an upstanding arcuate portion 225a which is normally positioned inwardly adjacent the side of a ratchet wheel 226 fixed to a shaft 228 extending across the machine. The arcuate portion 225a is of such height that when it is in the inward position described, it will prevent a driving pawl 229 from dropping into contact with the teeth of the ratchet wheel 226. A spring 230 positioned between the pawl hold-out member 224 and the side plate 83 of the machine serves to hold the pawl hold-out member 224 in the position described, the action of the spring being transmitted through link 223 and rod 218 to hold the arms 219 of the rod in engagement with the trip control levers 214.

The pawl 229 is pivoted on a bell crank member 232, a flat spring or the like being provided to tend the pawl to downward position. The bell crank 232 is freely mounted for rotation on the shaft 228 and a rod 233 extends, as shown in Figure 15, from the bell crank 232, the opposite end of rod 233 being provided with a strap 234 which encircles an eccentric 235 on the main cam shaft 56.

As shown in Figures 15, 17 and 18, the shaft 228 has fixed thereto a pinion 236 which meshes with a pinion 237 fixed on lifting drive shaft 55. Shaft 55 has worm gears 238 fixed to each end thereof and each of which, as shown in Figures 3 and 4, meshes with a worm wheel 239 on each of the longitudinally extending chain driving shafts 54. Therefore, rotation of shaft 228 in a counter-clockwise direction (Figure 18) will rotate the sprockets 90 on the chain driving shafts 54 to lift the stack 51.

The operation of the lift control mechanism described above is as follows: As the front suction cups 172 are lowered to contact with the uppermost sheet on the stack 51, the projection 173a at the upper end of each of the cup supporting rods 173 will move toward the flange 211 on the trip member 63. Should the portion of the stack beneath that front suction cup be at such height that it is not necessary to lift the stack before the cups descend again, the downward movement of the suction cup will be so limited by the stack that the shoulder 173a of the cup rod will not come into contact with the flange 211 of trip 63. Immediately subsequent to this downward movement of the suction cup, the lift drive eccentric 235 on the main cam shaft 56 will move to a position to impart a downward movement to pawl operating rod 233, moving the pawl 229 to the left as viewed in Figure 18. However, since lift control trip 63 has not been moved by the downward movement of the suction cup, the pawl hold-out member 224 will be in inward position shown in Figure 18 and therefore in the path of movement of pawl 229, preventing the pawl from engaging the teeth of the ratchet wheel 226, so that shaft 228 will not be rotated, and the stack platform will remain in its former position.

In the event that the stack is at such height that either front suction cup 172 must move downwardly to a position approximating its extreme limit of downward movement to contact with the uppermost sheet of the stack, it would, of course, be necessary that the stack be raised before the suction cups again descend. This action will be accomplished due to the fact that when either suction cup moves downwardly a greater than predetermined distance, the shoulder 173a thereon will come into contact with the flange 211 of trip 63, moving this trip downwardly against the action of spring 212 so that the far end 216 of corresponding lever 214 will be raised, thereby rocking the rod 218. The above described turning movement of rod 218 will be transmitted through its arm 222 and the link 223 to move the flange 225 of pawl hold-out member 224 upwardly, thereby moving the latter member outwardly (to the right in Figure 18) and away from the ratchet wheel 226 to the dotted line position shown in Figure 17. As a result, when the bell cank 232 and the pawl 229 carried thereby are swung to the left (Figure 18), the shaft 228 will be turned and the pinion 236 thereon will rotate to permit the larger pinion 237 on the lifting drive shaft 55 to turn the latter shaft. Such rotation of shaft 55 will rotate the chain drive shafts 54 to raise the platform 50 before the suction cups 172 again descend.

The distance which the platform 50 is raised by each movement of the lifting pawl 229 is preferably slightly greater than the thickness of a sheet of the material which is being handled by the feeder. With such a setting of the lift control mechanism, the suction cups will contact with the flange 211 of lift trip 63 on approximately four successive downward strokes out of each five such strokes and the uppermost sheet of the stack will thereby be maintained at a height at which it can be readily engaged by the front suction cups.

In the handling of relatively thick sheets of stock, for example metal sheets, it is found that the thickness of the individual sheets may vary over the area of one sheet and when such variances are totaled in a stack from three to five feet high, one side of the stack may be lower than the other. By the present arrangement of having a lift control trip 63 positioned adjacent each of the front suction cups, should the stack adjacent that cup be low because of variances in the thickness of the sheets, the trip 63 actuated by that cup will be continuously responsive to this condition and will keep that portion of the stack sufficiently high to permit the cup to engage that side of the uppermost sheet. This may, of course, result in the portion of the stack at the other side being at more than normal height, but this will not affect the operation of the machine since the suction cup at the high side of the stack will merely move down a smaller distance than normal, the shortness of its stroke being accommodated by the spring 165 which moves the suction cups of the forwarding mechanisms 60 to downward position.

The feed table

The feed table 65 is best illustrated in detail in Figures 1, 6 and 8.

As is shown in Figure 1, the feed table comprises longitudinally extending bars 240 at each side edge thereof, which bars are secured at their rear ends, that is, their ends to the left in Figures 1 and 8, to the side plates 82 and 83 of the feeder frame. As is shown in Figure 1, rods 241 connect the two bars 240 adjacent their outer ends, and, as shown in Figure 6, vertical members 242 extend downwardly from the rods 241 to a supporting member indicated in dotted lines, which member is an element of the apparatus to which the feeder delivers sheets. In order to further brace the outfeed table and to form a shelf beneath the same, longitudinal members 243 are provided beneath the same, extending from the plates 82 and 83 to the vertical members 242.

The portion of the feed table between the side plates 82 and 83 includes longitudinal strips 244, spaced across the machine, and upon which the sheets removed from the stack 51 will be positioned by the forwarder suction cups 172. The ends of these strips adjacent the gauge plate 61 may be turned downwardly to facilitate the entrance of the leading edge of the sheet between these strips and upper or hold-down strips 245, suitably vertically spaced from the strips 244 and having their ends adjacent the stack also upturned. The lower strips 244 are supported upon blocks fixed to a rod 246 extending between the side plates and the upper strips 245 are carried by blocks fixed to a rod 247, also extending between the side plates. The rods 241 carry strips 248 extending longitudinally of the feed table, the latter strips having their rear ends (left-hand ends in the figures) spaced from the forward ends of the strips 244. This gap between the two sets of strips is closed by the reject member 68 which comprises tongues 249 fixed to a shaft 250 having its ends journalled in the bars 240. As is described in our divisional application for Calipering mechanism, the reject member 68 may be swung upwardly to divert the sheets beneath the feed table and onto the members 243. In order to firmly connect the tongues 249 with respect to each other, their forward ends may be connected by a cross member 251.

The sheets are moved along the feed table by the outfeed rolls 64 which are fixed to a shaft 252 and by outfeed rolls 253 fixed on shafts 254, 254a and 254b. The shaft 252 has its ends journalled in the side plates 82 and 83 and the shaft 254 is also journalled in these plates, while the shafts 254a and 254b, which are forward of the reject member 68, are journalled in the bars 240. The rolls 64 and 253 have their peripheries scored and these rolls are positioned between the strips and the tongues of the reject member. The shaft 252 is provided with a pinion which is not shown but is positioned behind the guide roller 255 (Figure 11) on the same shaft, the pinion meshing with the gear 256 (Figure 11) on the main cam shaft 56. A sprocket wheel 257 (Figure 6) on shaft 252 drives a sprocket chain 258, which chain extends about a sprocket wheel on shaft 254 to drive the latter and the rolls 253 thereon. An idler take-up sprocket 259 is provided as shown in Figure 6 to permit the chain 258 to be adjusted. From a second sprocket positioned on shaft 254 there extends a sprocket chain 260 which moves about a sprocket on adjacent shaft 254a, a third sprocket chain 261 extending from the last-mentioned shaft to the outermost shaft 254b. A guard plate 262 may be positioned above the sprocket chains as shown in Figure 6.

The shafts 254a and 254b are journalled in brackets 263 mounted upon the bars 240, the brackets being secured to the side bars by means of bolts extending through slots 240a as shown in Figure 3. The provision of the slots enables the brackets to be adjusted along the bars to thereby take up slack in the sprocket chains 260 and 261.

In order to hold the sheet in close contact with the driven outfeed rolls 64 upon the first outfeed shaft 252, a hold-down roll 66 (Figure 8) is positioned upon the outer end of a horizontal arm of each one of a pair of bell-cranks 265 transversely spaced upon the rod 247. The other arm 266 of each bell-crank is provided with a roller which engages one of two cams 267 so spaced on the main cam shaft 56 as to be opposite the bell-cranks, a spring 266a being provided to hold the rollers in contact with the cam. Each cam 267 is designed to bring the hold-down roll 66 controlled thereby downwardly upon the upper surface of a sheet immediately after the leading edge of the sheet has been positioned upon the outfeed rolls 64 on the first shaft 252. One of the hold-down rolls 66 is preferably provided beneath the outer edge of each forwardly mechanism 68.

In order to hold the sheets in contact with the driven rolls 253 on the shafts 254, 254a, 254b, the brackets 263 have rods 268 extending across the feed table between the same, which rods are provided with downwardly extending brackets 269 spaced along the same and having horizontally extending arms 270 pivoted thereon. Each arm 270 includes a shoe 271 adapted to be held spaced above the feed table surface by contact of a hold-down roll 272, journalled in the arm, with a roll 253 on shaft 254a or 254b. Coil springs 273 are positioned between the under surfaces of extensions 274 upon the brackets 269 and the upper surfaces of the arms 270 to hold the rolls 272 in contact with the driven rolls 253 on the shafts 254a and 254b. The rod 169 is provided with similar brackets 269.

The hold-down rolls 66 and 272 are provided with rubber surfaces to bear upon the sheets passing beneath the same.

The operation of the feed table will be apparent from the above description of its construction, the operation of the reject member 68 being hereinafter more fully described in the immediately succeeding section of the specification. The calipering or gauging mechanism 67 is described in detail in our application for Calipering mechanism.

*The motor and pump assembly*

The motor 72 and the pressure and suction pumps 70 and 71, respectively, are best shown in Figures 3, 4 and 19. The motor and pumps are mounted on bases secured to the forward sides of the standards 80 and 81. As best shown in Figure 19, the drive shaft 375 of the motor 72 is operatively connected to the driving shaft 376 of the pumps 70 and 71. The magnetic clutch 74 is adapted to connect shaft 376 with a shaft 377 having a bevelled gear 378 fixed thereto arranged to mesh with a bevelled gear 379 on a shaft 380 carrying a bevelled gear 381 which meshes with a bevelled gear 382 on shaft 228. As will be hereinafter described, when the clutch 74 is in engaged position, the motor 72, through shaft 380, will drive shaft 228 to lift or lower the stack platform 50.

The inlet 385 of suction pump 71 is connected by a lead 386 to the valve mechanism 73 described in detail in our divisional application for Sheet handling mechanisms for sheet feeders, and which valve mechanism controls, through lines 418 and 419, the suction exerted at the suction cups 172 and 132 of the forwarder and separating mechanisms, respectively. These latter mechanisms are also described in said divisional application. The outlet of the suction pump is connected by piping 387 to the inlet pipe 70a of the pressure pump 70, remaining air required by the pressure pump being drawn through the mouth of inlet pipe 70a. The outlet from the pressure pump is connected by a line 388 to the pressure tank 389, from which extends a pressure line 390 leading to the valve mechanism 73. The lines 386 and 390 may be provided with pressure regulating valves 386a and 390a, respectively, as shown.

It will be observed that the pressure tank 389 is mounted above the pumps 70 and 71 and that the valve mechanism 73 is arranged above the pressure tank. By this arrangement, any oil which might be forced into the pressure tank with the compressed air from pump 70 will settle in the bottom of the pressure tank 389, instead of moving upwardly through the pressure line 390 to the valve casing. A bleed line 391 extends from the lower portion of pressure tank 389 to a point of connection with the inlet 385 of suction pump 70 and line 391 is provided with a valve 391a which will be maintained in almost closed position. This permits oil to settle in the pressure tank so that the latter, in effect, forms an oil reservoir from which oil flows into the suction pump and thence to the pressure pump, keeping both pumps lubricated, but with no possibility of oil flowing upwardly to the valve mechanism and the suction cups 132 and 172 or blast nozzles 140. Flow of compressed air to the blast nozzles 140 through line 423 is also controlled by the valve mechanism 73 as described in our divisional application mentioned immediately above.

The pressure tank 389 may be provided with cooling fins 389a to hold the same at a low temperature and thereby prevent oil in the tank from becoming vaporized. So long as the oil does not vaporize, there is little possibility of it being moved from the tank and through the pressure line.

*The drive mechanism used in changing stacks*

The drive mechanism used in changing stacks is shown in Figures 15 to 18 and 19. As is illustrated in Figure 19, and as has been described above, the motor 72 which ordinarily drives only the suction and pressure pumps 70 and 71 has upon its shaft a magnetic clutch 74 which magnetic clutch is ordinarily disengaged. The driven element of the clutch 74 is carried by a shaft 377 which acts through bevelled gears 378 and 379 to drive a shaft 380 extending upwardly on the left-hand side of the machine as indicated in Figures 1, 2 and 4, the upper end of shaft 380 carrying a bevelled gear 381 which meshes with the bevelled gear 382 on the horizontally arranged cross shaft 228.

As has been heretofore explained, shaft 228 is ordinarily rotated with a step by step rotation by the engagement of pawl 229 with ratchet wheel 226 fixed to shaft 228. Therefore, in order to enable shaft 228 to be continuously rotated to drive shaft 55 and, therethrough, the chain drive shafts 54, it is necessary to hold pawl 229 out of engagement with the ratchet wheel 226. To accomplish this purpose, a pawl hold-out member 440, best shown in Figures 16 and 18, is pivoted upon a stud 442 carried in the side plate 83. The hub of the pawl hold-out member 440 is pivotally connected to a link 443, the lower end of the link being pivotally connected to a lever 444 which is mounted for swinging movement on a stud 445, also fixed in the side plate 83. The opposite end of lever 444 is pivotally connected to a small cross head 446 (Figures 6 and 15) mounted on the armature 447 of a solenoid 448 fixed to the cross beam 86. By this arrangement, when the solenoid 448 is energized through suitable circuits hereinafter described and which are actuated when the feeder is operated for stack changing, its armature 447 will be drawn upwardly, moving the left-hand end of lever 444 (Figure 18) upwardly and thereby raising the pawl hold-out member 440 to lift pawl 229 and hold it out of engagement with the teeth of ratchet wheel 226.

The cross head 446 carries an adjustably mounted stud 450 at its outer end which stud, when the cross head moves upwardly as described above, is arranged to strike the actuating member 451 of a switch 452 mounted adjacent the solenoid 448. Switch 452 controls the flow of current to the magnetic clutch 74 and, by the above arrangement, after the pawl hold-out member 440 has been raised to lift the pawl 229 out of engagement with ratchet wheel 226, the magnetic clutch 74 will be energized so that motor 72 may continuously drive shafts 377, 380, 228, 55 and 54 to thereby either raise or lower the stack supporting platform 50, according to the direction in which the motor is rotated under the control of suitable switch elements, such as are illustrated in Figures 3 and 4 and acting through suitable circuits, hereinafter described.

When the platform 50 is moved downwardly to lower a stack from the separators 59 and feeders 60, the weight of the platform tends to cause the driving mechanism to overrun. In order to prevent such overrunning, a brake 460 is preferably provided on the lifting drive shaft 55, the general arrangement of this brake with respect to the other elements of the machine being shown in Figures 1 and 2 and the detailed construction of the brake being shown in Figure 7.

As is shown in Figure 7, a bracket 461 is secured to the underside of the cross beam 86 and this bracket supports a brake band 462 which surrounds a drum 463 encircling the shaft 55, brake band 462 being mounted for adjustment by means of the threaded shank 464. Keyed to the shaft 55 within the drum 463 is a collar 465 provided with side plates 466. The collar 465 has pockets 467 circumferentially spaced about its periphery, these pockets being of less depth at one end thereof. Within the pockets are mounted balls or rollers 468 and spring-pressed plungers 469 project into the pockets from the end opposite the end of less depth. During the movement of the shaft 55 in a direction to raise the platform 50, the balls or rollers 468 will tend to the deeper portion of the pockets 467 and the shaft will therefore rotate freely with respect to the drum 463 and brake band 462. However, when the shaft 55 is rotating to move the platform downwardly, its rotation will be in the direction of the arrow and the movement of collar 465 with the shaft will cause the balls or rollers 468 to move toward the shallower end of the pockets 467, thereby clutching the drum 463 to the collar 465 and shaft 55. This movement of the drum will be resisted by the brake band 462 and when the power applied to shaft 55 has been shut off, the band 462 will prevent overrunning of the shaft.

Should the pawl 229 drop into engagement with the ratchet wheel 226 on shaft 228 before the ratchet wheel has ceased to rotate, particularly during the downward movement of the stack platform, either the pawl 229 or teeth of the ratchet wheel 226 may be broken or chipped. In order to prevent the pawl from dropping too suddenly, a dashpot 475 is provided beneath the cross head 446, the plunger 476 of the dashpot being connected to the cross head 446 to prevent the latter from moving downwardly too suddenly and thereby permitting the pawl 229 from dropping too quickly after the current to solenoid 448 has been cut off.

As is indicated in Figure 19, the motor 72 will be connected to a suitable source of power to enable it to drive the pumps 70 and 71 during the ordinary operation of the feeder. During such operation the remaining mechanisms of the feeder are driven through clutch 69 by the shaft 58 operated from the press or other mechanism to which the sheets are delivered and the clutch 74 on shaft 376 is disengaged. For stack changing operations, by operation of the proper switch button on the control in Figure 3, the motor 72 may be run (with clutch 74 engaged), in one direction for lifting the stack table, or rotated in the reverse direction to enable the stack table to be moved downwardly.

Should the stack be moved too high during stack changing operation, the over-travel limit switch 110 will open the circuit to stop the lifting operation of motor 72.

The electrical circuits and the operation of the apparatus controls

The feeder is ordinarily controlled from the left-hand side thereof (Figure 4), since the control of the press or other apparatus to which the feeder delivers sheets can be reached from this point. Also, the clutch operating lever 276a of the feeder is within reach of the operator standing on the left-hand side of the feeder. In order to permit the operator to control the feeder during its ordinary operation, a control panel 481 including a "run" switch 482 (Figure 19) and a "stop" switch 483 is mounted on the standard 81. During preparation of the feeder for running, or for stack changing operations, the operator would control the feeder from the right-hand side (Figure 3) and a control panel 480 is provided at this point, which panel includes an "up" switch 485 (Figure 19), "run" switch 486, "down" switch 487 and "stop" switch 488.

As shown in Figure 19, alternating current to operate the motor 72 may be furnished through a three-wire main comprising lines 490a, 490b and 490c. Direct current to operate the magnetic clutch 74 may be supplied through a main including lines 491a and 491b.

When a stack 51 has been positioned between the chains 53, in order to move the stack upwardly to position the uppermost sheet thereof within reach of the separators 59 and forwarders 60, the operator would press "up" switch 485. This would result in a flow of current from main line 490b through leads 492, 492a, 493 and 494, relay 495, lead 496, through overtravel limit switch 110, lead 497, switch 485 and then through leads 498 and 499 to main line 490c. The armature of relay 495 would thus be moved to close the circuits through the four contactors carried thereby. Current would thus flow from main line 490a through relay contactor 500 to leads 502 and 503 to motor 72. Current would also flow to the motor from line 490b through relay contactor 504, lead 506 to motor 72. A third circuit would be established through contactor 507 as follows: from main line 490c, through contactor 507 to lead 508 and to the motor, these three circuits causing the motor to be rotated. The pumps would thereby be driven but since the main clutch 69 is not engaged to drive the main cam shaft 56, the various sheet handling mechanisms would not be operated and the fluid from the pumps would be ineffective.

Current would also flow through the fourth contactor 510 to keep the relay closed, as follows, from main 490b, through leads 492, 492a, 493 and 494, relay 495, lead 496, overtravel limit switch 110, leads 497 and 497a, through contactor 510, leads 515 and 516, normally closed stop switch 488, lead 517 through normally closed stop switch 483 and leads 518, 498a and 499 to main line 490c, thereby holding the relay 495 closed. In order to actuate the pawl hold-out member 404, a shunt circuit is provided from contactors 507 and 500 as follows: contactor 507, lead 519 through cut-out 519a, pawl hold-out actuating solenoid 448, leads 520 and 502 and contactor 500. Solenoid 448 will therefore be actuated to lift the cross head 446 to raise pawl hold-out member 440 so that the pawl 229 (Figure 18) will be disengaged from ratchel wheel 226 to permit shaft 228 to turn freely. The lifting of cross head 451 will also close switch 452 so that current may flow from line 490c through leads 499 and 498a, switch 452, lead 522, relay 523, leads 493, 492a and 492 tend to main line 490b, thus closing relay 523 which controls the current to magnetic clutch 74 from the D. C. lines 491a and 491b through the contactors of relay 523 and leads 525 and 526, respectively.

The stack platform 50 will move upwardly immediately magnetic clutch 74 is engaged since the motor is already running and the shaft 380 will now be rotated to drive shaft 228 continuously, pawl hold-out member 440 already having been placed in position to maintain pawl 229 lifted.

The stack 51 will move upwardly until it contacts with overtravel limit switch 110 to break the circuit through relay 495, thereby opening all of the above described circuits, or its upward movement may be stopped by operation of either of "stop" buttons 483 or 488 to opened position, thereby breaking the circuit through relay 495 to open the closed circuits described above.

In the use of the apparatus, a "run" switch would next be actuated to set the machine in normal operation. The circuits closed by the operation of the "run" switches will be subsequently described but in order to make the relative arrangement of the circuits more readily apparent, the "down" circuit is next described.

In order to move a platform downwardly to enable it to be removed from between the lifting chains 53, "down" switch 487 would be pressed inwardly against its inner set of contacts 487a, thereby causing current to flow through main line 490c, leads 499, 498 and 530, across bridged contacts 487a through leads 531 and 531a, relay 532, and leads 493, 492a and 492 to main line 490b. Relay 532 being energized would cause the four contactors thereof to complete the respective circuits in which they are included. More specifically, contactor 534 would close the following circuit: 490a, lead 535, contactor 534, and leads 501, 502 and 503 to motor 72. Contactor 536 would close the following circuit: main line 490c, lead 537, contactor 536, and lead 506 to motor 72. Contactor 538 would close a circuit from 490b, lead 492, contactor 538, and lead 508 to motor 72, thereby causing the motor to be operated. The fourth contactor 539 of relay 532 will close a circuit to hold the relay energized, as follows: From main line 490c through lead 499, 498a, 518, closed stop switch 483, lead 517, closed stop switch 488, leads 516 and 515, contactor 539, relay 532, leads 494, 493, 492a and 492 to main line 490b. A shunt circuit will be formed from contactor 538 through lead 519 by cut-out 519a and pawl hold-out member actuating solenoid 448 and then through leads 520 and 502 to contactor 534. This circuit will actuate solenoid 448 to raise cross head 446, thereby closing switch 452 and resulting in a circuit through solenoid 523 which controls the direct current circuit to the magnetic clutch 74 as set forth above. Actuation of the clutch will cause the shaft 380 to be operated in the manner already described, but to cause the platform 50 to be moved downwardly, the flow of current to motor 72 having been reversed.

Since the circuit which is holding the contactors of relay 532 in closed position passes through the stop switches 483 and 488, the above operation may be stopped by actuation of either of these stop switches.

The apparatus may be placed in normal running operation by actuating clutch operating lever 276a to move the main clutch 69 to engaged position, thereby causing the main cam shaft 56 to be driven, and by closing either "run" switch 482 or 486 to operate the motor 72 which drives the pumps 70 and 71 so that the separator and forwarder mechanisms will be effective.

Movement of "run" switch 482 to closed position will result in the following circuit: From main A. C. line 490c, leads 499, 498a and 518, through switch 482, leads 550, 551 and 552 to closed "down" switch 487, lead 553, relay 554, and leads 493, 492a and 492 to main line 490b. The actuation of relay 554 will cause the cut-out 519a, carried by the armature of the relay, to move out of line 519 so that no current can flow to pawl hold-out solenoid 448 and the latter can not cause the direct current line to magnetic clutch 74 to be closed, as occurs when the "up" or "down" switches are operated. The closing of the contactors 555 of relay 554 will result in a shunt circuit from lead 550 to lead 493, as follows:—through lead 550a, (including contactors 555) leads 560 and 556, relay 532 and to lead 493. Relay 532 being thus energized, will move its four contactors to set up circuits to drive the motor 72 and also to hold both it and the relay 554 energized. The circuits closed through contactors 534 and 536 to motor 72 will be the same as closed thereby during the "down" operation described above and the same will be true of the contactor 538 except that the shunt circuit to solenoid 448 which is closed during "down" operation cannot now be closed since the relay 554 holds cut-out 519a open, thereby preventing flow of current to pawl hold-out member actuating relay 448. The fourth contactor, 539, of relay 532 will close the following circuit: Main line 490c, leads 499, 498a and 518, closed stop switch 483, lead 517, closed stop switch 488, leads 516 and 515, contactor 539, lead 556, relay 532, and leads 493, 492a and 492 to line 490b. Relay 554 will be on a shunt from contactors 539 and 538, as follows: contactor 539, lead 560, contactors 555, leads 550a, 551 and 552, the bridged contacts of "down" switch 487, lead 553, relay 554, and leads 493 and 492a to contactor 538.

Obviously, the above circuits just described may be broken and the operation of motor 72 stopped upon actuation of either "stop" switch 483 or 488, since both of these switches are in the holding circuit.

If "run" switch 486 is actuated, current will flow from line 490c through leads 499, 498 and 530, "run" switch 486, the bridged contacts of "down" switch 487, lead 553, relay 554, and leads 493, 492a and 492 to line 490b, thus energizing relay 554. The closing of the contactors 555 of relay 554 will result in a shunt circuit from lead 552 to lead 493, as follows:—through leads 551, 550a, contactors 555, leads 560 and 556 and relay 532 to lead 493. Relay 532 thus being energized, the motor and holding circuits described in connection with the actuation of "run" switch 482 will be set up and actuation of either "stop" switch 483 or 488 will cause the circuits to be opened and motor 72 stopped.

*Summary of operation of apparatus*

The operation of each of the mechanisms of the present apparatus has been set forth in detail in connection with the description of that mechanism. The description set forth below is intended to summarize the operation of the entire apparatus.

As shown in Figure 2, the sheets to be handled by the feeder are positioned upon a platform or skid 50 such as may be handled by an industrial truck, the skid being positioned transversely of the machine with the legs of the platform resting upon the floor of the plant. A pair of the cross bars 52 may then be positioned beneath the platform and the hook members 99 of the bars engaged in the links of the sheets 53.

In order to position the left-hand edges of the sheets against the gauge bar 106, a lever such as 105 may be positioned in one of the notches of the notched plate 103 to force the platform and stack to the left. This operation will force the bars to the right so that the chains 53 will be slightly inclined toward their lower ends in that direction, thereby tending to draw the sheets to the left and against gauge bar 106 as they are moved upwardly.

The button marked "up" on control 480 (Figures 3 and 19) would then be pressed, causing motor 72 to act through magnetic clutch 74 to rotate shaft 380 (Figure 4) and, through the latter, shaft 228. The pawl hold-out member 440 would be raised at this time by the solenoid 448 to maintain the pawl 229 (Figure 18) out of engagement with the ratchet wheel 226 on shaft 228 so that the latter shaft will be free to rotate continuously and drive shaft 55 through pinions 236 and 237. A worm drive is provided between shaft 55 and chain drive shafts 54 so that the sprockets 90 upon the latter will move the chains 53 and thereby the platform 50 upwardly.

Should the operator fail to operate the "stop" button of either control 480 or 481 at the proper time, the top of the stack would come into contact with the overtravel limit switch 110, breaking the circuit to the motor 72, thereby stopping the lifting of the stack. In ordinary operation, however, the operator would press the "stop" button of control 480 or 481 when the uppermost sheet of the stack has reached the proper height to be engaged by the suction cups of the separator mechanism 59 and the forwarder mechanism 60. The operation of the "stop" button will cause the pawl hold-out member 440 to move to the position shown in Figure 18, permitting the pawl 229 to drop upon the pawl hold-out member 224.

In order to initiate the operation of the feeder toward feeding sheets to the press or other apparatus to which it is connected, the clutch operating handle 276a on clutch operating shaft 276 (Figure 4) is moved to engage the clutch 69 (Figure 11) through which the main cam shaft 56 is driven from the main drive shaft 58 extending from the press or other apparatus to which the sheets are to be delivered. The rotation of main cam shaft 56 will actuate all of the sheet handling mechanisms of the machine as well as the stack lifting mechanism. However, in order to cause sheets to be moved through the machine, the "run" button on either of controls 480 or 481 must be pressed to cause motor 72 to operate and drive suction pump 70 and pressure pump 71 to thereby furnish suction and the air blasts required to permit the sheets to be separated and moved from the stack 51.

The separators 59 will lift the rear corners of the top sheet, the forwarders 60 will move the sheet forwardly as described in our divisional application for Sheet handling mechanisms for sheet feeders.

During the bending of the rear corners of the sheets, blasts of air will be directed beneath the upturned portions from the nozzles 140, thereby facilitating the separation of the uppermost sheet from the next lowest sheet in the pile. The blasts of air will also move beneath the upturned corners to separate the entire area of the uppermost sheet from the remainder of the stack, causing the uppermost sheet to "float".

The stripper bars of stripper mechanism 62 will move upwardly adjacent the under surface of the sheet and thence rearwardly and downwardly, as described in our last-mentioned divisional application. By this action, any sheet displaced from the stack with the uppermost sheet will be engaged by the tips of the stripper bars and returned to proper position upon the stack 51, the forward portion of the uppermost sheet being positioned upon the driven outfeed rolls 64 just before the suction is released from the suction cups of the forwarder mechanism. Immediately thereafter, the hold-down rolls 66 will move downwardly upon the upper surface of the sheet to hold it in engagement with the driven outfeed rolls 64 so that the latter may move it through the calipering mechanism 67 and along the feed table 65 in the manner described in our divisional application for "Calipering mechanism."

In order to insure that the stack of sheets will be maintained at such a height that the uppermost sheet thereof may be engaged by the forwarder mechanism 60, a trip member 63 (Figure 18) is positioned in the path of downward movement of each front suction cup supporting rod 173, this trip controlling the actuation of the stack lifting mechanism 57. Should either front suction cup supporting rod 173 move downwardly a greater than predetermined distance in order to engage the uppermost sheet of the stack, a shoulder 173a thereon will contact with a flange 211 at the lower end of trip 63. Such downward movement of trip 63 will swing the inner end 216 of a lever 214 upwardly, thereby turning an arm 219 upon a shaft 218. As is best shown in Figures 17 and 18, the rod 218 has an arm 222 at its end adjacent the side plate 83 of the machine which arm would be moved upwardly by the action just described to swing a pawl hold-out member 224 to the right in Figure 18. At the same time, cam 235 (Figure 15) on cam shaft 56 will act, through a rod 233, to move the pawl carrier 232 to the right (Figure 15). This movement of the pawl carrier 232 will cause pawl 229 to turn ratchet wheel 226 through a partial rotation. Ratchet wheel 226 is fixed upon shaft 228 and the latter shaft will act through pinions 236 and 237 to rotate lifting drive shaft 55, thereby giving shafts 54 a slight rotation so that the sprocket wheels 90 on the latter shafts will be turned to move the chains and platform upwardly. Should the stack be at such height that the front suction cup supporting rods 173 do not have to move down sufficiently far in engaging a sheet to cause the shoulders 173a to contact with the flanges 211 of the trip members 63, the pawl hold-out member 224 will not be moved from the position illustrated in Figure 18 and therefore, when the pawl carrier 232 is moved forwardly by the action of cam 235, the pawl 229 will merely ride on the pawl hold-out member 224 instead of engaging the ratchet wheel 226 and the height of the pile will not be changed.

The gearing through which pile 51 is raised in the manner described above is preferably so arranged that each forward movement of pawl 229 in driving ratchet wheel 226 will lift the stack a distance slightly greater than the thickness of one of the sheets being handled in the feeder. By this arrangement, the stack will be lifted after approximately four out of each five downward movements of the front suction cups and its height will be maintained substantially constant.

The positioning of a lift control trip 63 adjacent each forwarder mechanism 60 will insure that both sides of the stack will be at the proper height. Heretofore, the lift control trips of feeders have usually been positioned at a point midway of the width of the stack. In handling heavy materials, for example, tin sheets, the thickness of the sheets may vary over the area thereof and this frequently results in one side of the stack being lower than the other. If the lift control trip is positioned midway of the width of the stack, it will not be altogether responsive to such a condition and, in order to correct for this difficulty, it has been usual to drive wedges into the lower portion of the lower side of the stack to maintain the sheets level so that they will be engaged by the forwarder mechanism. By the present arrangement of having a lift control trip directly adjacent each forwarder mechanism, the portion of the stack adjacent each such mechanism will be maintained at such a height that the forwarder mechanism on that side of the apparatus can always contact with the uppermost sheet.

A sheet moving from the calipering mechanism 67 along the feed table 65 will be held in contact with a series of driven outfeed rolls 253 (Figure 1) by means of spring-pressed and idler hold-down rolls 272 mounted in brackets 269 as shown in Figure 8 so that the sheets will be properly fed from the apparatus.

Since the lifting chains 53 hang free at their lower ends, it is possible to position a second platform 50a (Figure 2) carrying a stack 51a upon the lower portions of the chains when substantially all of the sheets upon the first platform 50 have been removed. When the sheets upon the upper platform 50 have been entirely removed, actuation of the feeder may be stopped and the "down" button of the control 480 may be actuated to move the upper platform downwardly sufficiently far to permit the latter and its supporting cross bars 52 to be removed from the chains. The "up" button would then be actuated to move the lower platform 50a upwardly to present the stack carried thereby to the sheet handling mechanisms. The feeder may then be set in operation in the manner described above.

It will be obvious from the above that our invention provides a sheet feeder as well as various mechanisms included therein which fulfill all of the stated objects of the invention and which are, in numerous other respects, marked improvements upon prior art machines and mechanisms.

It will be understood that the invention is not limited to the details of construction shown in the drawings and that the examples of the use of the machine and mechanisms which have been given do not include all of the uses of which they are capable, and that the phraseology employed in the specification is for the purpose of description and not of limitation.

We claim:

1. The combination in a sheet feeder, of a stack lifting mechanism, a forwarder for removing sheets from the stack positioned adjacent each side of the stack, and means to control the actuation of said stack lifting mechanism including a trip member positioned in the path of movement of each of said forwarders.

2. The combination in a sheet feeder, of a stack lifting mechanism including a rotatable element, step-by-step driving means engageable with said rotatable element to rotate the same, a forwarder for removing sheets from the stack, means controlled by the movement of said forwarder to control the engagement of said driving means with said rotatable element, a second driving means to rotate said rotatable element, and means to hold said step-by-step driving means out of engagement with said rotatable element during actuation of said second driving means.

3. The combination in a sheet feeder, of a stack lifting mechanism including a rotatable element, driving means to rotate said rotatable element, a second driving means to rotate said rotatable element, a clutch connection between said second driving means and said rotatable element, means to disconnect said first-named driving means and engage said clutch, and means to retard the re-engagement of said first-named driving means when said clutch is disengaged.

4. The combination in a sheet feeder, of transversely spaced chains having their lower ends hanging free to support a stack holding platform, a gauge bar, means whereby the sheets may be forced toward said bar to thereby force the platform and chains away from said bar to cause upward movement of said chains to press the edges of the sheets against said bar.

5. A stack platform supporting element for sheet feeders adapted to engage lifting chains of the feeder, the ends of said element being provided with double hook members arranged to engage vertically adjacent links of the lifting chain, the lower hook of each hook member being arranged to be out of contact with the cross pin of the link with which it is engaged when the upper hook is in contact with the cross pin of the link with which it engages.

6. The combination in a sheet feeder, of a stack moving mechanism including a rotatable element, a motor, a clutch adapted to operatively connect said motor and rotatable element, means to actuate said clutch, and a motor circuit including means to operate said clutch actuating means.

7. The combination in a sheet feeder, of a stack moving mechanism including a rotatable element, a motor to drive said rotatable element, a relay, a power circuit for said motor controlled by said relay, a holding circuit for said relay, said holding circuit including a limit switch arranged in the path of movement of the stack carried by said stack moving mechanism.

8. The combination in a sheet feeder, of a stack moving mechanism including a rotatable element, means to engage said rotatable element to rotate the same in one direction, a source of power to rotate said rotatable element in either direction, and electrically operated means to connect said source of power to said rotatable element including initially actuated means to disconnect said first named driving means from said rotatable element.

9. The combination in a sheet feeder, of a stack moving mechanism including a rotatable element, means to engage said rotatable element to rotate the same step-by-step, a source of power to rotate said rotatable element continuously, and electrically operated means to connect said source of power to said rotatable element including initially actuated means to disconnect said first named driving means from said rotatable element.

10. The combination in a sheet feeder, of a stack moving mechanism including a rotatable element, driving means to rotate said rotatable element, a second driving means to rotate said rotatable element, means to disengage one of said driving means from said rotatable element and re-engage the other driving means with the rotatable element including means to retard such re-engagement until the disengaged means has discontinued rotation.

11. The combination in a sheet feeder, of a stack support, operating mechanism for said stack support including a rotatable element, power means, means to move said rotatable element from said power means by step-by-step movement, means to move said rotatable element from said power means by continuous movement, means to actuate said power means to move said rotatable element through said continuous movement means, and means controlled by said last-named means to disconnect said step-by-step moving means from said rotatable element.

12. The combination in a sheet feeder, of a stack support, operating mechanism for said stack support including a rotatable element, power means, means to move said rotatable element from said power means by step-by-step movement, means to move said rotatable element from said power means by continuous movement, and means to disconnect said step-by-step movement means from said rotatable element and to connect said continuous movement means thereto upon actuation of said power means to drive said rotatable element through said continuous movement means.

13. The combination in a sheet feeder, of a stack support, operating mechanism for said stack support including a rotatable element, means to move said rotatable element step-by-step including a source of power, means to move said rotatable element in continuous movement including a source of power, means to actuate the source of power of said continuous movement means to move said rotatable element, and means controlled by said last-named means to disconnect said step-by-step moving means from said rotatable element.

14. The combination in a sheet feeder, of a stack support, operating mechanism for said stack support including a rotatable element, means to move said rotatable element step-by-step including a source of power, means to move said rotatable element in continuous movement including a source of power, and means to disconnect said step-by-step movement means from said rotatable element and to connect said continuous movement means thereto upon actuation of the source of power of said continuous movement means.

15. The combination in a sheet feeder, of a stack support, operating mechanism for said stack support including a rotatable element, means to move said rotatable element step-by-step, means to move said rotatable element in continuous movement including an electric motor and a clutch, means to disengage said step-by-step moving means upon actuation of said motor, and means actuated by operation of said last-named means to cause said clutch to engage.

16. The combination in a sheet feeder, of a stack support, operating mechanism for said stack support including a rotatable element, means to move said rotatable element step-bystep, means to move said rotatable element in continuous movement including an electric motor and a clutch, means to disengage said step-by-step moving means upon actuation of said motor, means actuated by operation of said last-named means to cause said clutch to engage, and retarding means operable to delay reengagement of said step-by-step moving means upon discontinuance of said continuous movement means and until said clutch has been disengaged.

17. The combination in a sheet feeder, of a stack support, operating mechanisms for said stack support including a rotatable element, a plurality of means to respectively and alternatively move said stack by step-by-step or continuous movement, and means to delay reengagement of said step-by-step movement means with said rotatable element until said continuous movement means has been disconnected therefrom.

18. The combination in a sheet feeder, of a stack support, operating mechanism for said stack support including a rotatable element, power means, means to move said rotatable element from said power means by step-by-step movement, means to move said rotatable element from said power means by continuous movement, means to actuate said power means to move said rotatable element through one of said moving means, and means controlled by said last-named means to disconnect said other moving means from said rotatable element.

19. The combination in a sheet feeder, of a stack support, operating mechanism for said stack support including a rotatable element, power means, means to move said rotatable element in one direction from said power means, means to move said rotatable element from said power means in either direction, means to actuate said power means to move said rotatable element through said two-directional movement means, and means controlled by said last-named means to disconnect said single direction moving means from said rotatable element.

20. The combination in a sheet feeder, of a stack support, operating mechanism for said stack support including a rotatable element, power means, means to move said rotatable element in one direction from said power means, means to move said rotatable element in either direction from said power means, and means to disconnect said single direction moving means from said rotatable element and to connect said two-directional movement means thereto upon actuation of said power means to drive said rotatable element through said two-directional movement means.

GEORGE GOEBEL.
SHERMAN A. CHANTLAND.